United States Patent
Luan

(10) Patent No.: US 11,462,002 B2
(45) Date of Patent: Oct. 4, 2022

(54) WALLPAPER MANAGEMENT METHOD, APPARATUS, MOBILE TERMINAL, AND STORAGE MEDIUM

(71) Applicant: ZTE CORPORATION, Guangdong (CN)

(72) Inventor: Lan Luan, Guangdong (CN)

(73) Assignee: ZTE Corporation, Guangdong (CN)

( * ) Notice: Subject to any disclaimer, the term of this patent is extended or adjusted under 35 U.S.C. 154(b) by 0 days.

(21) Appl. No.: 17/263,134

(22) PCT Filed: Jul. 25, 2019

(86) PCT No.: PCT/CN2019/097630
§ 371 (c)(1),
(2) Date: Jan. 25, 2021

(87) PCT Pub. No.: WO2020/020271
PCT Pub. Date: Jan. 30, 2020

(65) Prior Publication Data
US 2021/0271921 A1  Sep. 2, 2021

(30) Foreign Application Priority Data
Jul. 25, 2018 (CN) .......................... 201810826480.5

(51) Int. Cl.
*G06F 9/451* (2018.01)
*G06V 10/75* (2022.01)
(Continued)

(52) U.S. Cl.
CPC ............ *G06V 10/751* (2022.01); *G06F 9/451* (2018.02); *G06F 16/2365* (2019.01);
(Continued)

(58) Field of Classification Search
CPC .... G06F 9/451; G06F 16/2365; G06F 16/583; G06K 9/62; G06K 9/6215; G06T 7/90;
(Continued)

(56) References Cited

U.S. PATENT DOCUMENTS

2005/0071771 A1  3/2005  Nagasawa et al.
2012/0294531 A1*  11/2012  Matsubara ......... G06K 9/00496
382/190

(Continued)

FOREIGN PATENT DOCUMENTS

CN  103019766 A  4/2013
CN  103631580 A  3/2014
(Continued)

OTHER PUBLICATIONS

ZTE Corporation, First Office Action, CN 2018108264805, dated Jun. 22, 2020, 3 pgs.
(Continued)

*Primary Examiner* — Phi Hoang
(74) *Attorney, Agent, or Firm* — USCH Law, PC

(57) ABSTRACT

Disclosed are a wallpaper management method and apparatus, a mobile terminal, and a storage medium. The method includes: determining a wallpaper to be switched; obtaining feature information of the wallpaper to be switched, and comparing the feature information of the wallpaper to be switched with the feature information of wallpapers in a feature database, to determine, in the feature database, a wallpaper matching the wallpaper to be switched; and performing wallpaper switching according to feature information corresponding to the matching wallpaper.

16 Claims, 18 Drawing Sheets

(51) Int. Cl.

| | | |
|---|---|---|
| *G06T 7/90* | (2017.01) | |
| *G06F 16/583* | (2019.01) | |
| *G06F 16/23* | (2019.01) | |
| *G06K 9/62* | (2022.01) | |
| *G06T 3/40* | (2006.01) | |
| *H04W 88/02* | (2009.01) | |

(52) U.S. Cl.
CPC ......... *G06F 16/583* (2019.01); *G06K 9/6215* (2013.01); *G06T 3/40* (2013.01); *G06T 7/90* (2017.01); *G06T 2207/20021* (2013.01); *H04W 88/02* (2013.01)

(58) Field of Classification Search
CPC . G06T 2207/20021; G06T 3/40; H04W 88/02
See application file for complete search history.

(56) References Cited

U.S. PATENT DOCUMENTS

| | | | |
|---|---|---|---|
| 2013/0069962 A1* | 3/2013 | Nealer | H04M 1/72427 345/522 |
| 2013/0120430 A1* | 5/2013 | Li | G06F 3/0483 345/589 |
| 2014/0226868 A1* | 8/2014 | Ruzon | G06F 16/583 382/107 |
| 2015/0205498 A1* | 7/2015 | Levi | G06F 3/04842 715/763 |
| 2015/0234861 A1* | 8/2015 | Kojima | G06V 10/507 382/190 |
| 2018/0081616 A1* | 3/2018 | Choi | H04M 1/72412 |
| 2018/0157936 A1* | 6/2018 | Lee | G06V 20/20 |
| 2018/0164960 A1* | 6/2018 | Kumar | G06F 21/31 |
| 2019/0147293 A1* | 5/2019 | Dahiya | G06V 40/161 382/118 |

FOREIGN PATENT DOCUMENTS

| | | |
|---|---|---|
| CN | 104657037 A | 5/2015 |
| CN | 105224162 A | 1/2016 |
| CN | 105959403 A | 9/2016 |
| CN | 106155454 A | 11/2016 |
| CN | 106339499 A | 1/2017 |
| CN | 106445297 A | 2/2017 |
| CN | 106851003 A | 6/2017 |
| CN | 106896995 A | 6/2017 |
| CN | 107122097 A | 9/2017 |
| CN | 107577485 A | 1/2018 |
| CN | 108090894 A | 5/2018 |
| CN | 109344273 A | 2/2019 |
| WO | 2018056532 A2 | 3/2018 |

OTHER PUBLICATIONS

ZTE Corporation, International Search Report, PCT/CN2019/097630, dated Oct. 29, 2019, 3 pgs.

ZTE Corporation, CN Final Office Action, 201810826480.5, dated May 19, 2021, 5 pgs.

Binhao Chen, "The Design and Implementation of Double Lockscreen Application Module Based on Android," Chinese Master's Theses Full-text Database, Feb. 15, 2016, 70 pgs.

Yong Wang et al., "Design and implementation of real-time image monitoring system based on Android mobile terminal," 2014 IEEE 7th Joint International Information Technology and Artificial Intelligence Conference (ITAIC), Dec. 31, 2014, 5 pgs.

* cited by examiner

_US 11,462,002 B2_

WALLPAPER MANAGEMENT METHOD, APPARATUS, MOBILE TERMINAL, AND STORAGE MEDIUM

CROSS REFERENCE TO RELATED APPLICATIONS

The present application is a United States National Stage Application filed under 35 U.S.C. § 371 of PCT Patent Application Serial No. PCT/CN2019/096630, filed Jul. 25, 2019, which claims priority to Chinese Patent Application No. 201810826480.5, filed with the Chinese Patent Office on Jul. 25, 2018, each of which is incorporated herein by reference in its entirety.

The present disclosure claims priority to Chinese Patent Application No. 201810826480.5, filed with the Chinese Patent Office on Jul. 25, 2018, which is incorporated herein by reference in its entirety.

TECHNICAL FIELD

The present disclosure relates to, but is not limited to, the field of mobile terminals, for example, to a wallpaper management method and apparatus, a mobile terminal, and a storage medium.

BACKGROUND

A wallpaper of a mobile terminal is a background image used by a screen of the mobile terminal. A user may select a favorite wallpaper, and the wallpaper makes the mobile terminal more beautiful and more personalized. The wallpaper may be displayed under the desktop, and characters on the desktop or colors of other interfaces may change as the wallpaper changes. Currently, wallpapers may be classified into static wallpapers and dynamic wallpapers. In addition, a resource type of the wallpaper may be in a form of a bitmap, an input stream, a uniform resource identifier (URI), or the like.

In an application of the mobile terminal, when a wallpaper is set, a large number of information transfer parameters generally need to be added in a procedure (this is implemented in many forms, such as broadcast and callback), to ensure that a status of a wallpaper set in a system is consistent with a status of a wallpaper selected by the user. Therefore, the user generally needs to confirm again after selecting the wallpaper. Due to multi-thread switching, various wallpaper setting sources, logic of the application, and the like, a status of the wallpaper recorded in the application may be inconsistent with a status of the wallpaper set in the system.

SUMMARY

Embodiments of the present disclosure provide a wallpaper management method and apparatus, a mobile terminal, and a storage medium, to implement wallpaper switching as expected.

An embodiment of the present disclosure provides a wallpaper management method, including:

determining a wallpaper to be switched;

obtaining feature information of the wallpaper to be switched, and comparing the feature information of the wallpaper to be switched with feature information of wallpapers in a feature database, to determine, in the feature database, a wallpaper matching the wallpaper to be switched; and performing wallpaper switching according to feature information corresponding to a matching wallpaper.

An embodiment of the present disclosure further provides a wallpaper management apparatus, including:

a determining module, configured to determine a wallpaper to be switched;

a wallpaper feature obtaining module, configured to obtain feature information of the wallpaper to be switched;

a feature information comparison module, configured to compare the feature information of the wallpaper to be switched with feature information of wallpapers in a feature database, to determine, in the feature database, a wallpaper matching the wallpaper to be switched; and a feature information application module, configured to switch the wallpaper according to feature information corresponding to a matching wallpaper.

An embodiment of the present disclosure further provides a mobile terminal, including: a memory, a processor, and a computer program that is stored in the memory and runs on the processor, where the processor, when executing the computer program, implements the wallpaper management method.

An embodiment of the present disclosure further provides a computer-readable storage medium, storing computer executable instructions, the computer executable instructions being used for performing the wallpaper management method.

DETAILED DESCRIPTION

The following describes the embodiments of the present disclosure in detail with reference to the accompanying drawings. The embodiments in the present disclosure and features in the embodiments may be combined with each other in the case of no conflict.

The steps shown in the flowcharts in the accompanying drawings may be performed in, for example, a computer system having a group of computer-executable instructions. In addition, although a logic order is shown in the flowcharts, in some cases, the shown or described steps may be performed in an order different from the order herein.

In some embodiments of the present disclosure, extraction of feature information of a wallpaper is completed when a system wallpaper changes, and a process of setting and synchronizing an association status of a wallpaper is completed by comparing and confirming the feature information.

Figure 1:
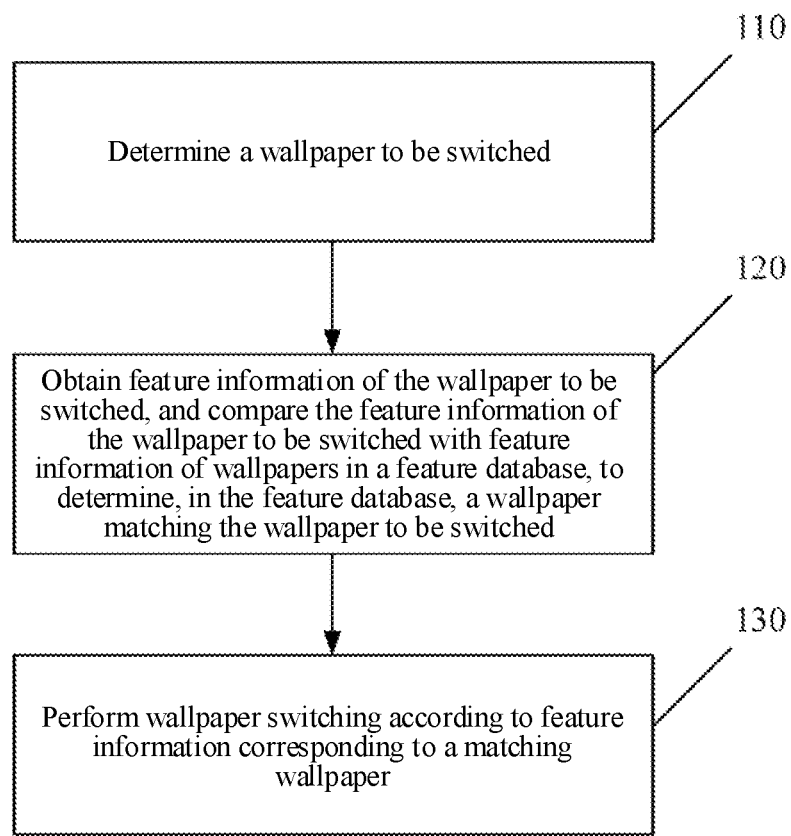
FIG. 1 is a flowchart of a wallpaper management method according to an embodiment of the present disclosure.

As shown in FIG. 1, an embodiment of the present disclosure provides a wallpaper management method, including the following steps.

Step 110: Determine a wallpaper to be switched.

Switching information of wallpapers may be listened to, and a wallpaper to be switched is determined according to the switching information. For example, the switching information may be obtained by listening to a system broadcast, and the switching information may include an identifier of the wallpaper to be switched. The wallpaper to be switched refers to a selected wallpaper to be switched to, that is, a current wallpaper needs to be switched to the wallpaper to be switched.

Step 120: Obtain feature information of the wallpaper to be switched, and compare the feature information of the wallpaper to be switched with feature information of wallpapers in a feature database, to determine, in the feature database, a wallpaper matching the wallpaper to be switched.

The feature database stores feature information of wallpapers in wallpaper resources, and may also store classification attribute information and content information of the wallpapers.

The feature information may include a feature primary key and may further include a feature auxiliary key. The feature information of the wallpapers in the feature database may also include a feature additional key and a customized feature key.

The feature primary key is used for identifying a main feature attribute of the wallpaper and is unique. In the embodiments of the present disclosure, the feature primary key may be obtained by processing the wallpaper, for example, analyzing a grayscale feature value.

The feature auxiliary key is used for identifying an auxiliary feature attribute of the wallpaper and assisting the feature primary key in wallpaper identification, and the feature auxiliary key is not unique. In the embodiments of the present disclosure, the feature auxiliary key may include a dominant color of the wallpaper.

The feature additional key is used for displaying visual effects after the wallpaper is valid, and may include at least one of a color of foreground text and a color of a status bar.

The customized feature key is pre-designed with visual effects and is related to feature attributes associated with the wallpaper. The customized feature key is mainly derived from a preset configuration file.

Step 130: Perform wallpaper switching according to feature information corresponding to a matching wallpaper.

In the embodiments of the present disclosure, feature information matching is performed, to avoid inconsistency between a status of a wallpaper recorded in an application and a status of a wallpaper set in a system, which results from transmissions in the application and abnormality caused by setting an external wallpaper interface.

Figure 2:
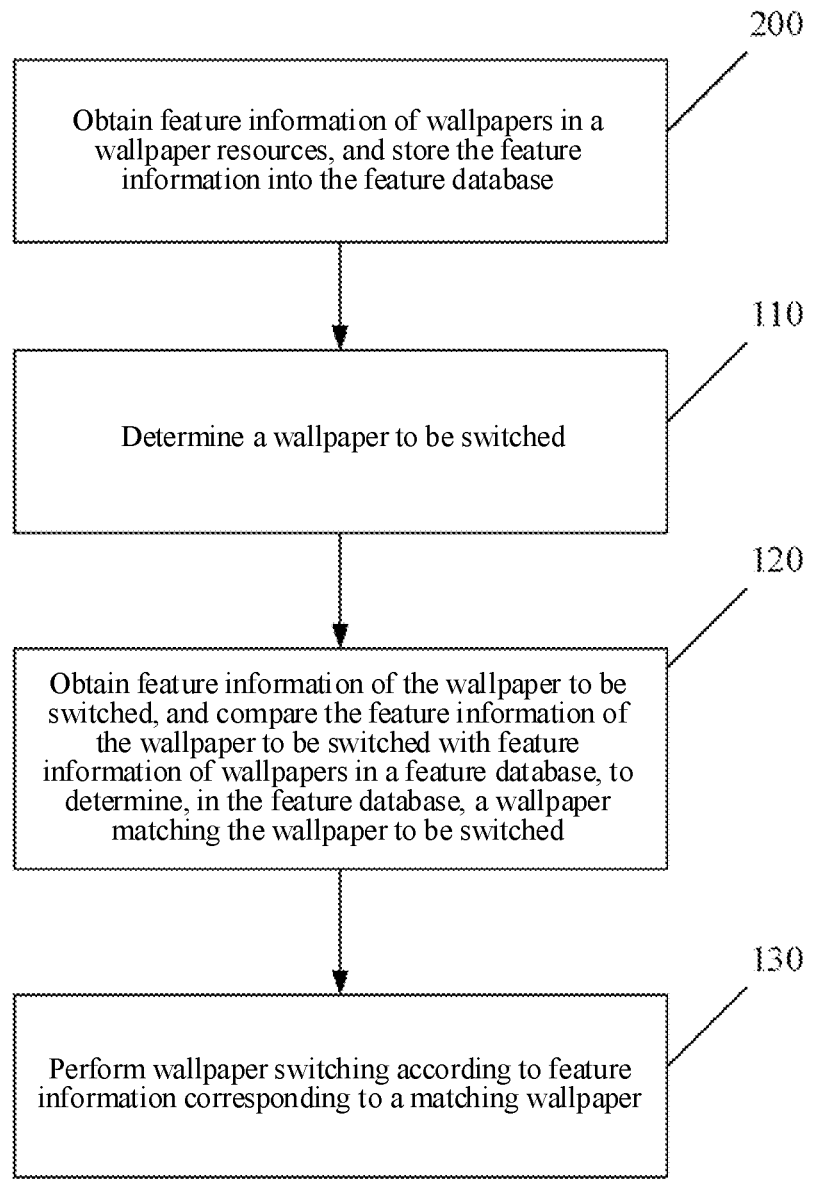
FIG. 2 is a flowchart of another wallpaper management method according to an embodiment of the present disclosure.

As shown in FIG. 2, in an embodiment, before step 110, the method further includes the following step:

Step 200: Obtain feature information of wallpapers in a wallpaper resources, and store the feature information into the feature database.

Similarly, the feature information may include the feature primary key, and may further include the feature auxiliary key, the feature additional key, and the customized feature key.

The feature primary key and the feature auxiliary key are used for wallpaper comparison in step 120, and the feature additional key and the customized feature key are used for display of the wallpaper after switching in step 130.

In step 200, feature information of the wallpaper resource preset in the system and an online wallpaper resource downloaded by a user may be initialized to the feature database. In addition, auxiliary customized information (that is, the customized feature key) may also be stored into the feature database.

In step 200, a resource that may be set as a wallpaper in the system is firstly obtained. The wallpaper resource may include at least one of the following: a wallpaper preset in a mobile terminal, a desktop customized wallpaper resource bundle, a downloaded wallpaper resource, a wallpaper resource in a downloaded theme, and a dynamic wallpaper resource bundle. The wallpaper preset in the mobile terminal may be a wallpaper preset in a system layer of the mobile terminal, and the downloaded wallpaper resource and the wallpaper resource in the downloaded theme may be downloaded from an online beautifying store by the user. Different types of resources may be obtained in different manners due to different storage manners, and existing obtaining manners may be used. Details are not described herein again.

Figure 3:
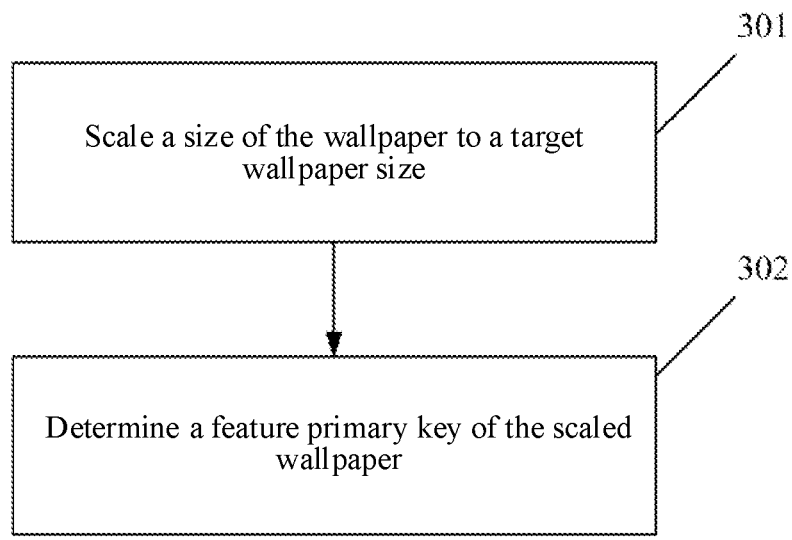
FIG. 3 is a flowchart of obtaining feature information of a wallpaper in a wallpaper resource according to an embodiment of the present disclosure.

In an embodiment, as shown in FIG. 3, the obtaining feature information of a wallpaper in a wallpaper resource includes the following steps.

Step 301: Scale a size of the wallpaper to a target wallpaper size.

Because sizes of wallpapers in wallpaper resources are different and are generally large, calculation processing is relatively complex. Therefore, the wallpaper is scaled to a proper size in the step 301. This process may also be referred to as formatting.

Step 302: Determine a feature primary key of the scaled wallpaper.

The scaled wallpaper is divided into a plurality of blocks, and a feature value corresponding to each block is further calculated, to obtain the feature primary key.

Before step 301, the wallpapers in the wallpaper resources may also be sorted.

Sorting may be performed according to a specified sequence as required. For example, for the desktop customized wallpaper resource bundle, loading and calculation are performed immediately when a desktop is started; and the wallpaper resource downloaded from the online beautifying store is related to recommended wallpapers.

Figure 4:
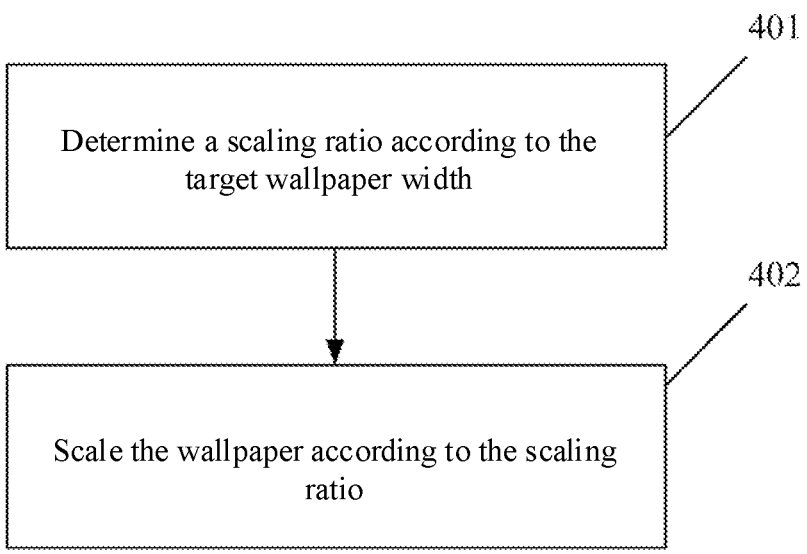
FIG. 4 is a flowchart of scaling a size of a wallpaper in a wallpaper resource to a target wallpaper size according to an embodiment of the present disclosure.

As shown in FIG. 4, in an embodiment, the target wallpaper size includes a target wallpaper width, and the scaling a size of the wallpaper to a target wallpaper size includes the following step.

Step 401: Determine a scaling ratio according to the target wallpaper width.

The target wallpaper width is $W_{Target}$ and the scaling ratio is generated according to $W_{Target}$ and a width $W_{Res}$ of the wallpaper in the wallpaper resource.

$$R = W_{Res}/W_{Target}$$

Step 402: Scale the wallpaper according to the scaling ratio.

If the scaling ratio R is less than 2, it may be set that the scaling ratio R=1.

Figure 5:
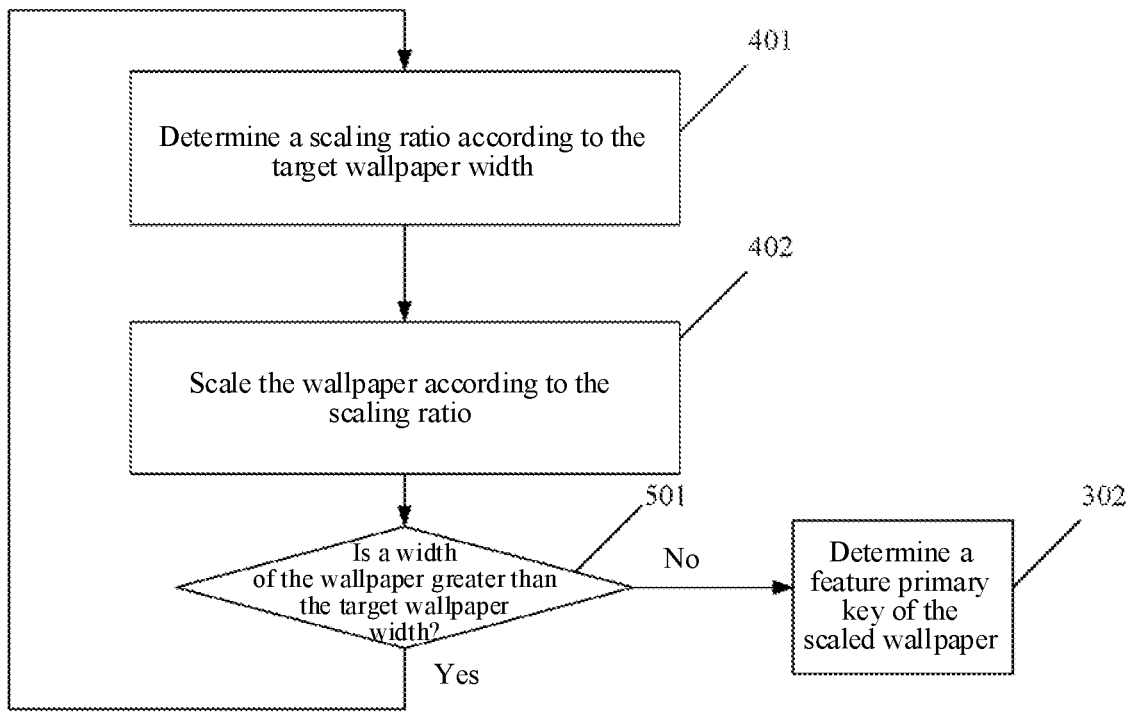
FIG. 5 is another flowchart of scaling a size of a wallpaper in a wallpaper resource to a target wallpaper size according to an embodiment of the present disclosure.

As shown in FIG. 5, in an embodiment, after step 402, the method may further include the following step.

Step 501: Check the scaled wallpaper, to determine whether the width of the wallpaper is greater than $W_{Target}$. If the width of the processed wallpaper is still greater than $W_{Target}$, steps 401 to 402 are performed again to scale the wallpaper, to make the width of the wallpaper less than or equal to $W_{Target}$, thereby ensuring precision during extraction of wallpaper features. If the width of the wallpaper is less than or equal to $W_{Target}$, step 302 is then performed.

The scaling in the embodiments of the present disclosure includes equal scaling, and a height is adjusted while the width is adjusted.

In addition, the target wallpaper size may alternatively include a target wallpaper height, and the wallpaper may alternatively be scaled according to the target wallpaper height.

Figure 6:
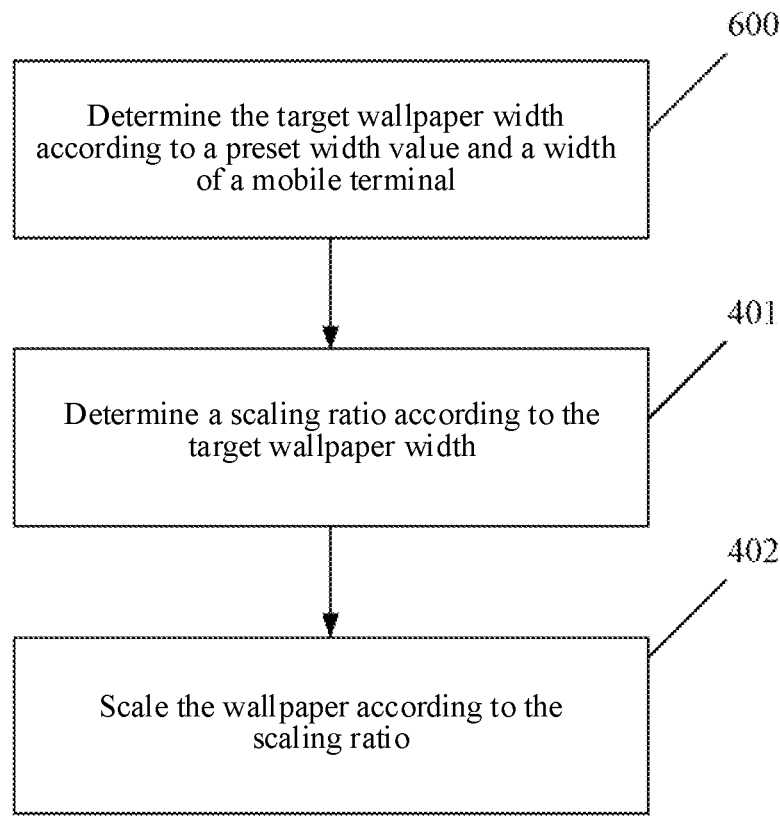
FIG. 6 is still another flowchart of scaling a size of a wallpaper in a wallpaper resource to a target wallpaper size according to an embodiment of the present disclosure.

As shown in FIG. 6, in an embodiment, before determining a scaling ratio according to the target wallpaper width, the method further includes the following step.

Step 600: Determine the target wallpaper width according to a preset width value and a width of a mobile terminal.

The target wallpaper width may be a preset value, or may be determined according to the preset width value and the width of the mobile terminal. For example, the target wallpaper width may be set as:

$$W_{Target} = \text{Math.max}(W_m, W_{phone}/12)$$

$W_m$ is the preset width value, $W_{phone}$ is the width of the mobile terminal. If the wallpaper has a width exceeding the preset width value $W_m$, a calculation time for features of the wallpaper is excessively long, thereby affecting a wallpaper setting process of the user. The value $W_m$ is an empirical value, which may be determined by taking a computing capability of the mobile terminal and a general size of a wallpaper into consideration after a large amount of calculation.

Figure 7:
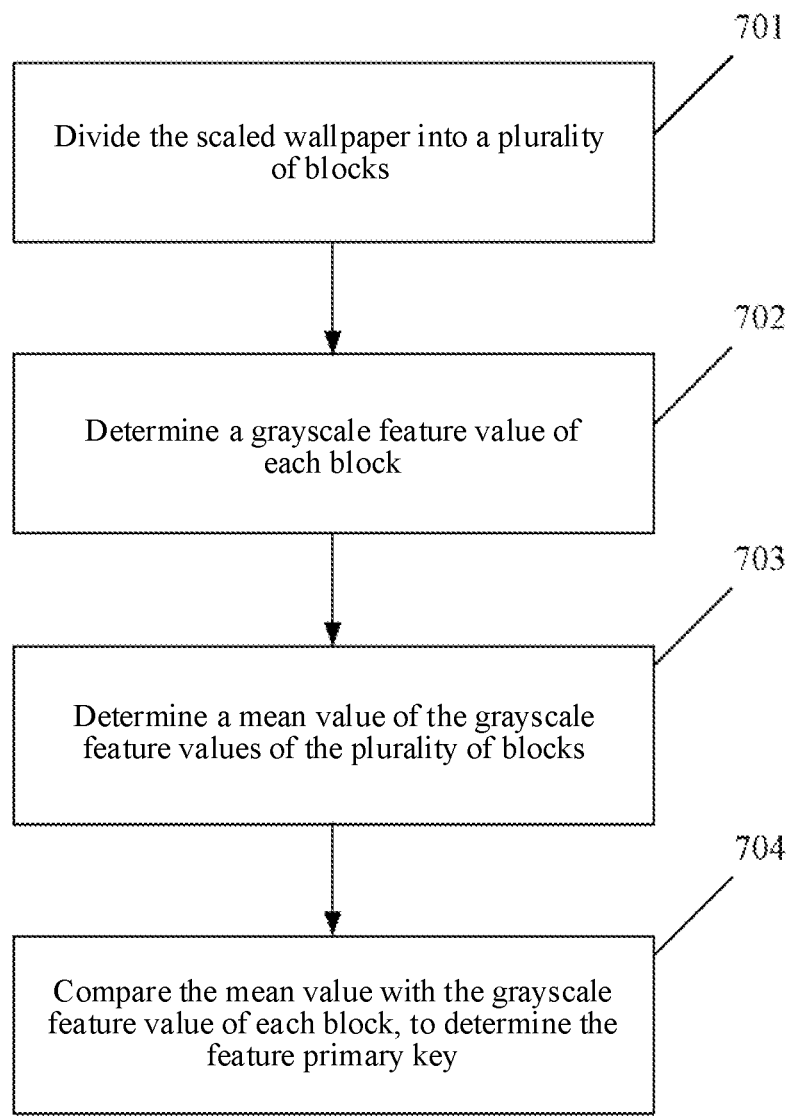
FIG. 7 is a flowchart of determining a feature primary key of a scaled wallpaper according to an embodiment of the present disclosure.

As shown in FIG. 7, in an embodiment, the determining a feature primary key of the scaled wallpaper includes the following steps.

Step 701: Divide the scaled wallpaper into a plurality of blocks.

Division is performed based on a fixed proportion. A width of each block is recorded as $W_{Scale}$, and a height of each block is recorded as $H_{Scale}$.

The scaled wallpaper may be divided into R1×R2 blocks, where $$R1 = W_{Target}/W_{Scale}, R2 = H_{Target}/H_{Scale}.$$

Step 702: Determine a grayscale feature value of each block.

Figure 8:
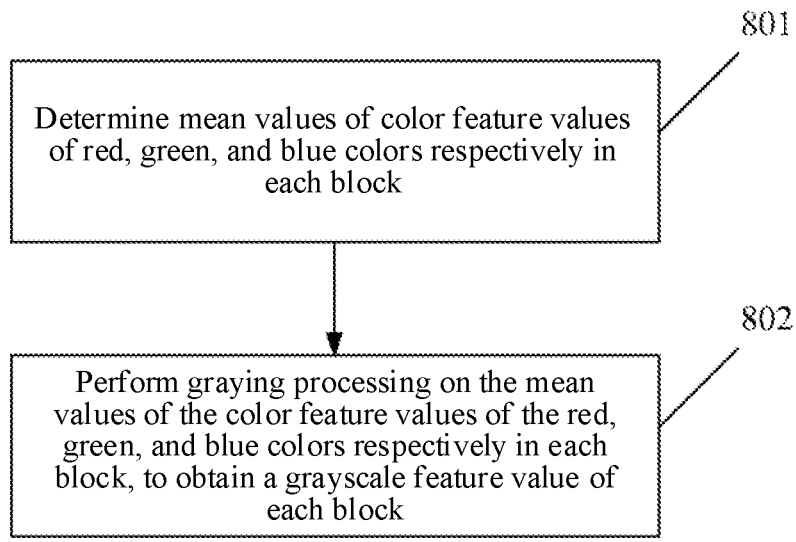
FIG. 8 is a flowchart of determining a grayscale feature value of each block according to an embodiment of the present disclosure.

As shown in FIG. 8, in an embodiment, step 702 includes the following steps.

Step 801: Determine mean values of color feature values of red, green, and blue colors respectively in each block.

The color feature values of the red, green, and blue colors are: $R_B$, $G_B$, and $B_B$ respectively, where $$R_B = \Sigma \text{Color.red}(P)$$

P is a pixel point in the block, and ΣColor.red(P) represents an accumulated sum of red values of all pixel points in the block. $G_B$ and $B_B$ may be obtained in a similar manner.

The mean values of the color feature values of the red, green, and blue colors respectively in each block are obtained by dividing $R_B$, $G_B$, and $B_B$ by a quantity of pixels respectively, and the mean values of the three colors are recorded in an array $A_{R1*R2}$.

Step 802: Perform graying processing on the mean values of the color feature values of the red, green, and blue colors in each block, to obtain a grayscale feature value of each block. The feature values in $A_{R1*R2}$ are grayed according to the following formula, and processed data is stored in $G_{R1*R2}$.

$$V = 0.3r + 0.58g + 0.12b$$

r, g, and b represent color values of red, green, and blue respectively in $A_{R1*R2}$.

Step 703: Determine a mean value of the grayscale feature values of the plurality of blocks.

The grayscale feature values of the blocks are averaged. That is, values in $G_{R1*R2}$ are averaged, to obtain the mean value $A_g$.

Step 704: Compare the mean value with the grayscale feature value of each block, to determine the feature primary key.

Comparison is performed on $G_{R1*R2}$ and $A_g$. If the grayscale feature value in the data is greater than $A_g$, the feature value is 1; otherwise, the feature value is 0. In this way, a character string including R1×R2 feature units may be generated as a value of the feature primary key.

Comparison of wallpapers is limited by the size of the feature primary key. That is, a higher value of R1×R2 indicates higher precision during comparison, but also brings calculation consumption. Therefore, a feature auxiliary key may be used for assistance in comparison of similar wallpaper resources. In this embodiment, a value of a dominant color of the wallpaper resource is used for assistance, and the auxiliary key has a plurality of options and is alternative. The dominant color is selected because the dominant color is defined by visual effects as a feature value applied to software when the wallpaper changes. Therefore, the dominant color is selected to make full use of existing convenience.

Figure 9:
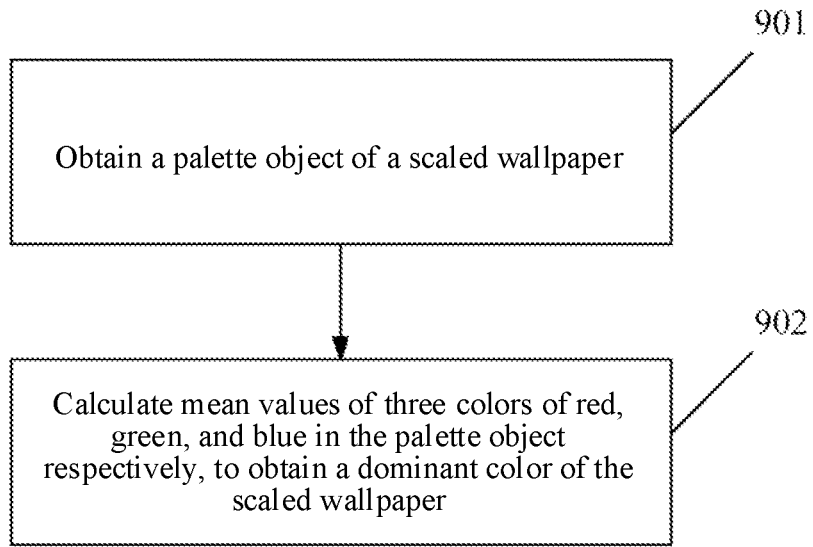
FIG. 9 is a flowchart of obtaining a dominant color of a wallpaper in a wallpaper resource according to an embodiment of the present disclosure.

As shown in FIG. 9, in an embodiment, the obtaining a dominant color of a wallpaper in a wallpaper resource may include the following steps.

Step 901: Obtain a palette object of the scaled wallpaper.

The palette object $P_{Target}$ is obtained from an inputted scaled wallpaper resource.

Step 902: Calculate mean values of three colors of red, green, and blue in the palette object respectively, to obtain the dominant color of the scaled wallpaper.

$R_B$, $G_B$, and $B_B$ are obtained by traversing $P_{Target}$. $G_B$ and $B_B$ may be obtained in a similar manner.

$$R_B = \Sigma Color.red(P)$$

The mean values of the red, green, and blue colors in the palette object are calculated respectively, that is, dividing $R_B$, $G_B$, and $B_B$ by the number of pixels respectively, to form the dominant color $C_{Main}$ of the wallpaper.

In addition to $C_{Main}$, values of other feature information related to the wallpaper are also calculated in the calculation process, and these values are irrelevant to the comparison of wallpaper features. These values are used for displaying visual effects after the wallpaper is valid. These values may include: $C_{Fore}$ (a color of foreground text) and $C_{Status}$ (a color of a status bar), and are used as feature additional keys.

In addition, the feature information may further include a customized feature key.

It may be analyzed, from a data source for calculating wallpapers, whether there is a customized key value, and the customized key value may be used as the customized feature key. The key values are irrelevant to the comparison of wallpaper features, and are used for associated modifications of visual effects after the wallpaper is valid.

In an embodiment, the customized feature key is derived from a preset configuration file.

Figure 10:
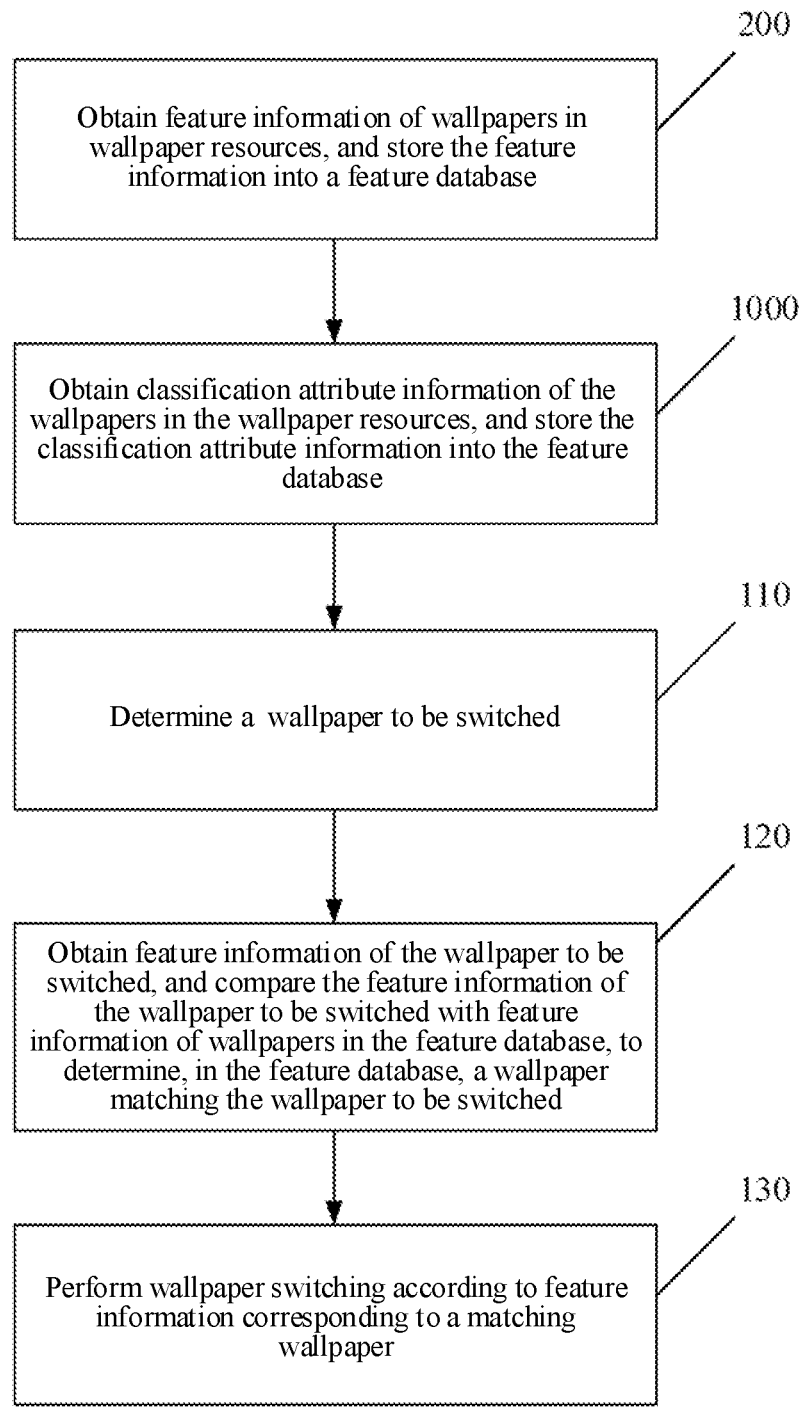
FIG. 10 is a flowchart of another wallpaper management method according to an embodiment of the present disclosure.

As shown in FIG. 10, in an embodiment, the method further includes the following step.

Step 1000: Obtain classification attribute information of the wallpapers in the wallpaper resources, and store the classification attribute information into the feature database.

In this step, classification attribute values of all resources are analyzed, to perform statistics on wallpaper preference of the user, for use in wallpaper recommendation.

Figure 11:
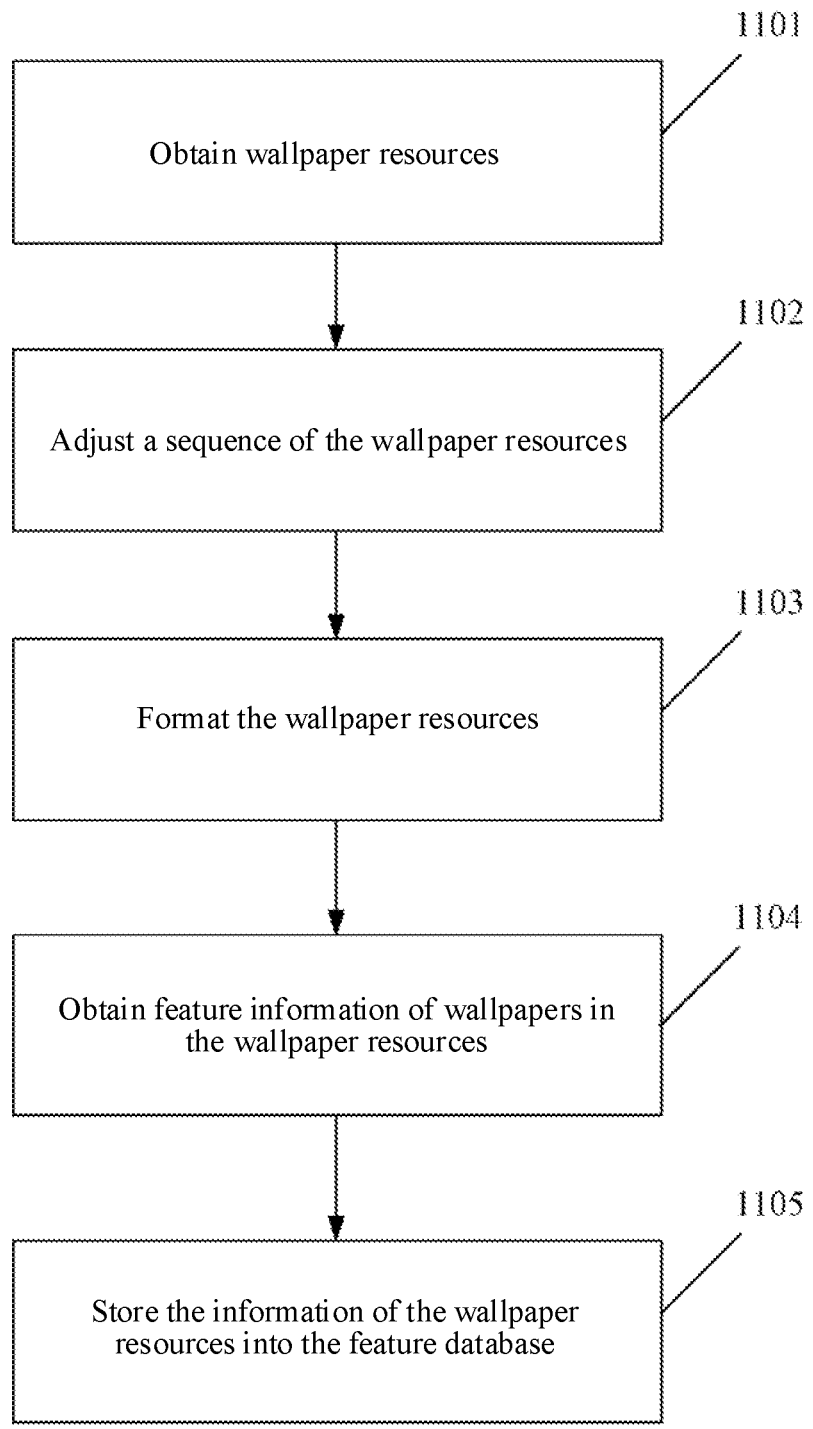
FIG. 11 is a flowchart of step 200 of an application example of the present disclosure.

As shown in FIG. 11, in an application example, step 200 may include the following substeps.

Step 1101: Obtain wallpaper resources.

All manageable wallpaper resources in the mobile terminal are scanned.

Step 1102: Adjust a wallpaper resource sequence.

That is, the obtained wallpaper resource is sorted.

Step 1103: Format the wallpaper resources.

In this step, a size of a wallpaper in the wallpaper resources is scaled to a target wallpaper size.

Step 1104: Obtain feature information of the wallpaper in the wallpaper resources.

A feature primary key, a feature auxiliary key, and a feature additional key of the wallpaper in the wallpaper resources may be obtained through calculation, and a customized feature key and wallpaper classification attribute information may also be obtained.

Step 1105: Store the information of the wallpaper resources into the feature database.

The feature primary key, the feature auxiliary key, the feature additional key, and the customized feature key are stored in the feature database. A primary key of the feature database is a resource identifier of the wallpaper resource, and the identifier is unified managed. Herein, a unique identifier of a wallpaper is defined as $ID_{Wallpaper}$.

Figure 12:
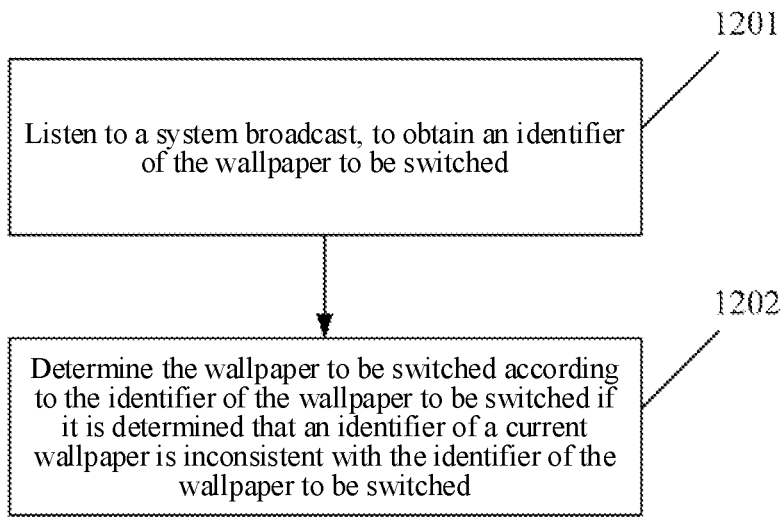
FIG. 12 is a flowchart of listening to switching information of wallpapers and determining a wallpaper to be switched according to the switching information according to an embodiment of the present disclosure.

As shown in FIG. 12, in an embodiment, the switching information includes an identifier of the wallpaper to be switched, and step 110 includes the following steps.

Step 1201: Listen to a system broadcast, to obtain an identifier of the wallpaper to be switched.

Listening may be performed by registering a system broadcast.

Step 1202: Determine the wallpaper to be switched according to the identifier of the wallpaper to be switched if it is determined that an identifier of a current wallpaper is inconsistent with the identifier of the wallpaper to be switched.

The wallpaper to be switched is determined according to the identifier of the wallpaper to be switched, so that parameters such as a size and a pixel value of the wallpaper to be switched may be obtained to perform extraction of feature information.

The description of a trigger process and a trigger time of a solution in the embodiment of FIG. 12 is description of a time at which the entire solution is executed. A trigger action occurs after the user clicks the UI interface to trigger a wallpaper change.

Figure 13:
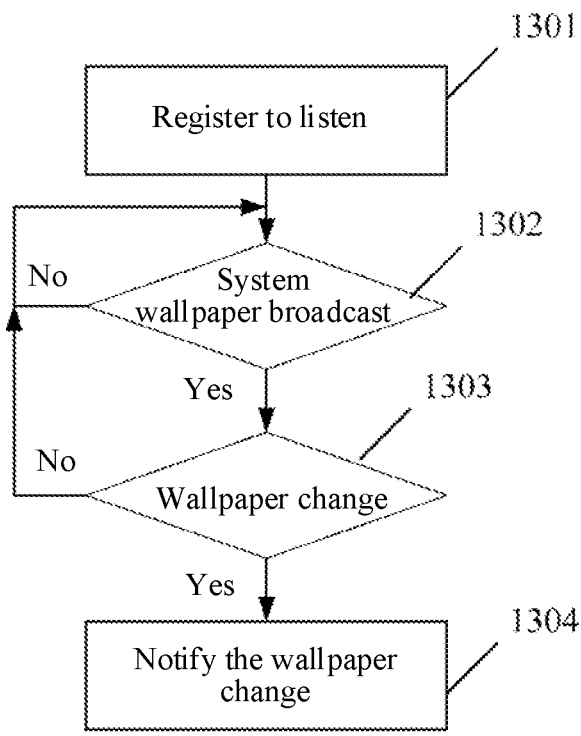
FIG. 13 is a flowchart of step 110 of an application example of the present disclosure.

As shown in FIG. 13, in an application example, step 110 may include the following substeps.

Step 1301: Register a system broadcast "android.intent.action.WALLPAPER_CHANGED"; and initialize a monitor class, where an identifier number of a current wallpaper in a system is recorded as $ID_{cache}$.

Step 1302: Wait for the system broadcast. When the system broadcast is received, current $ID_{sys}$ is obtained and step 1303 is performed; if there is no system broadcast, listening is continued.

Step 1303: Compare $ID_{sys}$ with $ID_{cache}$, if the two are the same, return to step 1302; otherwise, perform step 1304.

Step 1304: Determine the wallpaper to be switched, and instruct to extract a feature value of the wallpaper to be switched.

In step 120, the feature information of the wallpaper to be switched is obtained, and this process is similar to obtaining the feature information of a wallpaper in a wallpaper resource and may be performed with reference to step 200 and FIG. 3 to FIG. 9. The obtained feature information is the feature primary key and the feature auxiliary key, and it is unnecessary to obtain the feature additional key and the customized feature key. In addition, the information of the wallpaper to be switched is obtained by invoking a system interface.

Figure 14:
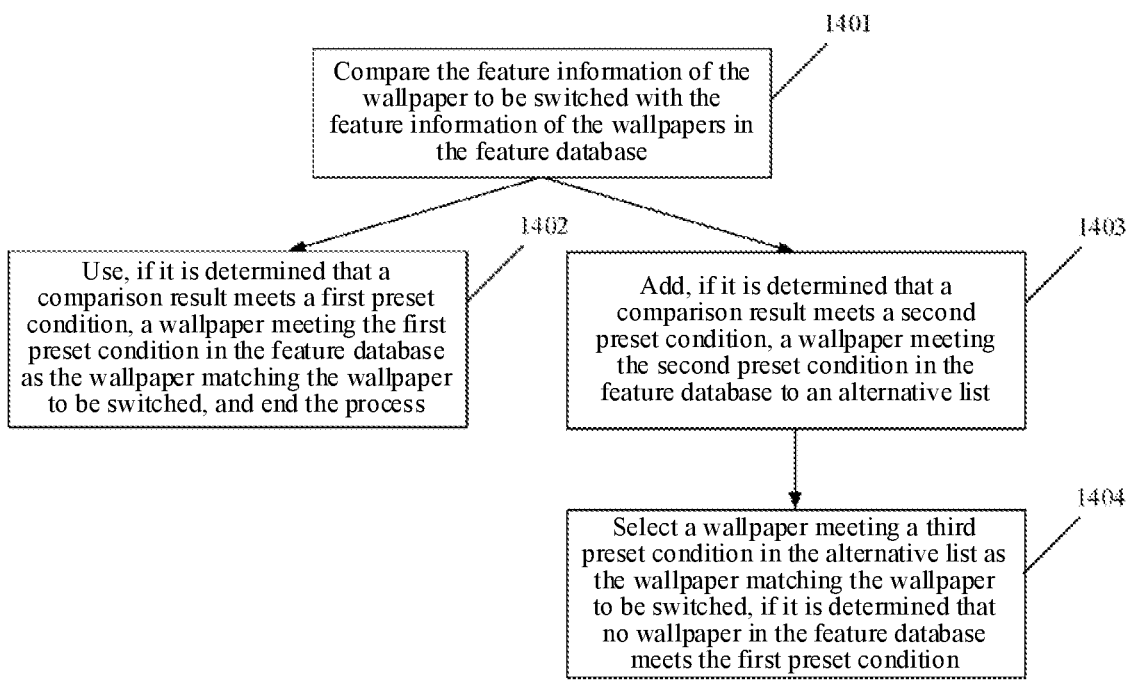
FIG. 14 is a flowchart of comparison according to an embodiment of the present disclosure.

As shown in FIG. 14, in an embodiment, the comparing the feature information of the wallpaper to be switched with feature information of wallpapers in a feature database, to determine, in the feature database, a wallpaper matching the wallpaper to be switched may include the following steps.

Step 1401: Compare the feature information of the wallpaper to be switched with the feature information of a wallpaper in the feature database.

Step 1402: If it is determined that a comparison result meets a first preset condition, use a wallpaper meeting the first preset condition in the feature database as the wallpaper matching the wallpaper to be switched; and end the process.

Step 1403: If it is determined that a comparison result meets a second preset condition, add a wallpaper meeting the second preset condition in the feature database to an alternative list.

Step 1404: If it is determined that no wallpaper in the feature database meets the first preset condition, select a wallpaper meeting a third preset condition in the alternative list as the wallpaper matching the wallpaper to be switched.

In an embodiment, the first preset condition is that: a distance difference between the feature primary key of the wallpaper to be switched and a feature primary key of the wallpaper in the feature database is less than a minimum primary key threshold, and a distance difference between the feature auxiliary key of the wallpaper to be switched and a feature auxiliary key of the wallpaper in the feature database is less than a maximum auxiliary key threshold.

The second preset condition is that: a distance difference between the feature primary key of the wallpaper to be switched and the feature primary key of the wallpaper in the feature database is less than a maximum primary key threshold.

The third preset condition is that: in the alternative list, a distance difference from the feature primary key of the wallpaper to be switched is the smallest, and a distance difference from the feature auxiliary key of the wallpaper to be switched is less than a minimum auxiliary key threshold; or in the alternative list, a distance difference from the feature primary key of the wallpaper to be switched is the smallest, a distance difference from the feature auxiliary key of the wallpaper to be switched is less than the maximum auxiliary key threshold, and a distance difference from the feature primary key of the wallpaper to be switched is less than an intermediate primary key threshold.

Figure 15:
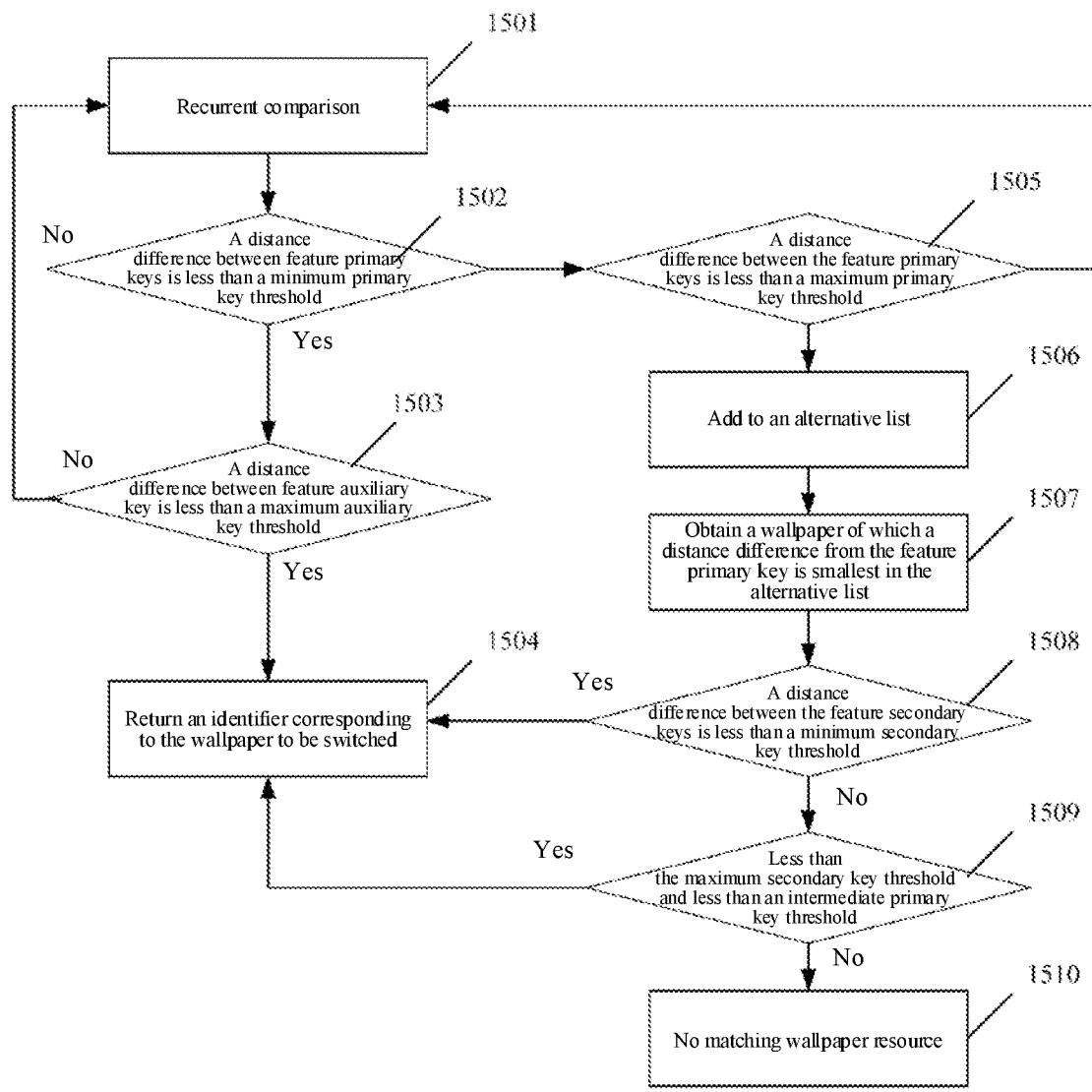
FIG. 15 is a flowchart of comparison of an application of the present disclosure.

As shown in FIG. 15, a comparison process is described by using an application example, and includes the following steps.

Step 1501: Compare the feature information $F_C$ of the wallpaper to be switched with feature information $F_I$ of wallpapers in a feature database recurrently.

A value of a feature primary key of $F_I$ is compared with a value of a feature primary key of $F_C$, and a distance difference $D_{diff}$ therebetween is calculated as a distance difference between the feature primary keys.

The value of the feature primary key of $F_I$ is compared with the value of the feature primary key of $F_C$ bit by bit, and when the two values are different, $D_{diff}$ is increased by 1.

In addition, a distance difference $A_{Diff}$ between feature auxiliary keys also needs to be calculated, and a calculation method is as follows:

$$D_R = R_{A_C} - R_{A_I} \quad D_G = G_{A_C} - G_{A_I} \quad D_B = B_{A_C} - G_{A_I};$$

$$A_{diff} = \sqrt{D_R^2 + D_G^2 + D_B^2}$$

where $R_{A_C}$, $G_{A_C}$, and $B_{A_C}$ are values of red, green, and blue in a dominant color of the wallpaper to be switched respectively, and $R_{A_I}$, $G_{A_I}$, and $B_{A_I}$ are values of red, green, and blue in a dominant color of a wallpaper in the feature database respectively.

Step 1502: Determine whether a distance difference $D_{diff}$ between the feature primary key of the wallpaper to be switched and the feature primary key of the wallpaper in the feature database is less than a minimum primary key threshold $M_{min}$, if yes, perform step 1503; otherwise, perform step 1505.

Step 1503: Determine whether a distance difference $A_{Diff}$ between the feature auxiliary key of the wallpaper to be switched and the feature auxiliary key of the wallpaper in the feature database is less than a maximum auxiliary key threshold $C_{max}$, if yes, perform step 1504; otherwise, perform step 1501.

Step 1504: If it is determined that the wallpaper to be switched and the wallpaper in the feature database match each other, return an identifier corresponding to the wallpaper to be switched, and end the process.

Step 1505: Determine whether the distance difference $D_{diff}$ between the feature primary key of the wallpaper to be switched and the feature primary key of the wallpaper in the feature database is less than a maximum primary key threshold $M_{max}$, if yes, perform step 1506; otherwise, perform step 1501.

Step 1506: Add a currently compared wallpaper in the feature database to an alternative list.

The alternative list may be in the form of an array $A_F$.

Step 1507: Obtain a wallpaper of which a distance difference from the feature primary key of the wallpaper to be switched is the smallest in the alternative list after the recurrent comparison is completed.

In this step, the most suitable wallpaper information is searched for in the array $A_F$. The feature information of a wallpaper with a minimum color difference is searched for by traversing $A_F$. That is, the wallpaper in the feature database corresponding to the smallest $D_{diff}$ is searched for.

Step 1508: Determine whether the distance difference $A_{Diff}$ between the feature auxiliary key of the wallpaper to be switched and the feature auxiliary key of the wallpaper in the feature database is less than a minimum auxiliary key threshold $C_{min}$, if yes, perform step 1504; otherwise, perform step 1509

Step 1509: Determine whether the distance difference $A_{Diff}$ between the feature primary key of the wallpaper to be switched and the feature primary key of the wallpaper in the feature database is less than an intermediate primary key threshold $M_{Media}$, and determine whether the distance difference $A_{Diff}$ between the feature auxiliary key of the wallpaper to be switched and the feature auxiliary key of the wallpaper in the feature database is less than a maximum auxiliary key threshold $C_{max}$, if yes, perform step 1504; otherwise, perform step 1510.

Step 1510: Determine that there is no matching wallpaper resource.

In step 130, switch the wallpaper according to the feature information corresponding to the matching wallpaper.

According to the foregoing steps, inconsistency between a status of a wallpaper recorded in the application and a status of a wallpaper set in the system caused by multi-thread switching, various wallpaper setting sources, or logic of the application may be avoided. In addition, currently, in a mainstream wallpaper setting procedure, a user generally needs to confirm again after selecting a wallpaper. This process artificially lengthens the process of wallpaper setting, and the user cannot immediately view a status of the wallpaper applied to the system. Through the embodiments of the present disclosure, the user does not need to confirm again, thereby achieving an effect of what you see is what you get.

In an embodiment, wallpaper switching is performed according to at least one of the feature additional key and the customized feature key that are included in the feature information corresponding to the matching wallpaper.

A priority of the customized feature key is higher than a priority of the feature additional key.

In the embodiments of the present disclosure, since wallpaper switching is performed according to at least one of the feature additional key and the customized feature key corresponding to the matching wallpaper, auxiliary visual effect information (for example, a foreground color or a color of a status bar) may be applied to an application, so that the application may present a more suitable visual effect.

Figure 16:
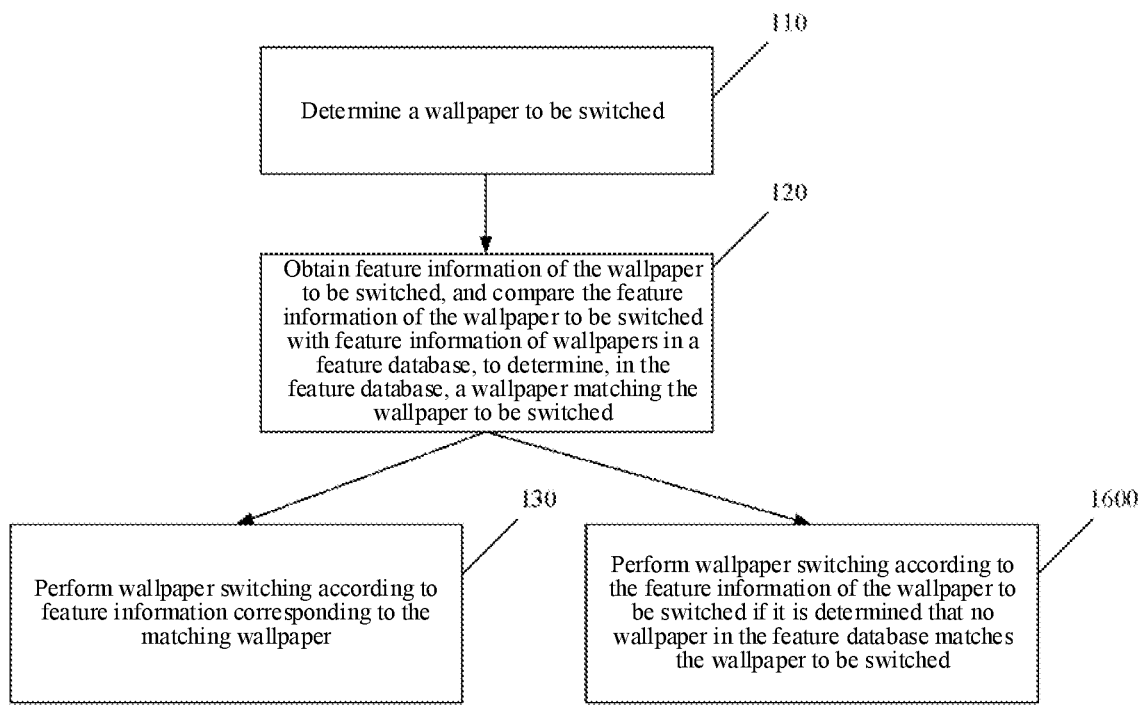
FIG. 16 is a flowchart of still another wallpaper management method according to an embodiment of the present disclosure.

As shown in FIG. 16, in an embodiment, the method further includes the following step.

Step 1600: Perform wallpaper switching according to the feature information of the wallpaper to be switched if it is determined that no wallpaper in the feature database matches the wallpaper to be switched.

If there is no corresponding wallpaper information in the current feature database, a visual effect feature of an interface directly uses a related feature of $F_C$ obtained through calculation according to step 120. Classification-related information corresponding to $F_C$ is also stored for use of statistics on wallpapers preferred by the user.

Figure 17:
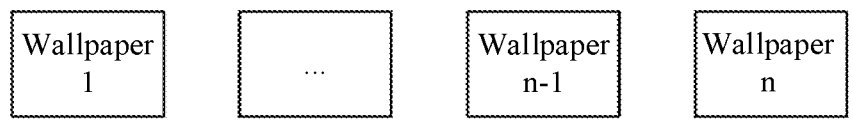
FIG. 17 is a schematic diagram of display of a user interface (UI) of an application example of the present disclosure.

FIG. 17 is a schematic diagram of UI display of an application example of the present disclosure. The user randomly selects in a wallpaper selection page, for example, selects a wallpaper n–1 in the figure, and the selected wallpaper is applied to the system in real time. Meanwhile, the feature additional key and the customized feature key will be applied to related software. Associated data is stored and synchronized.

Figure 18:
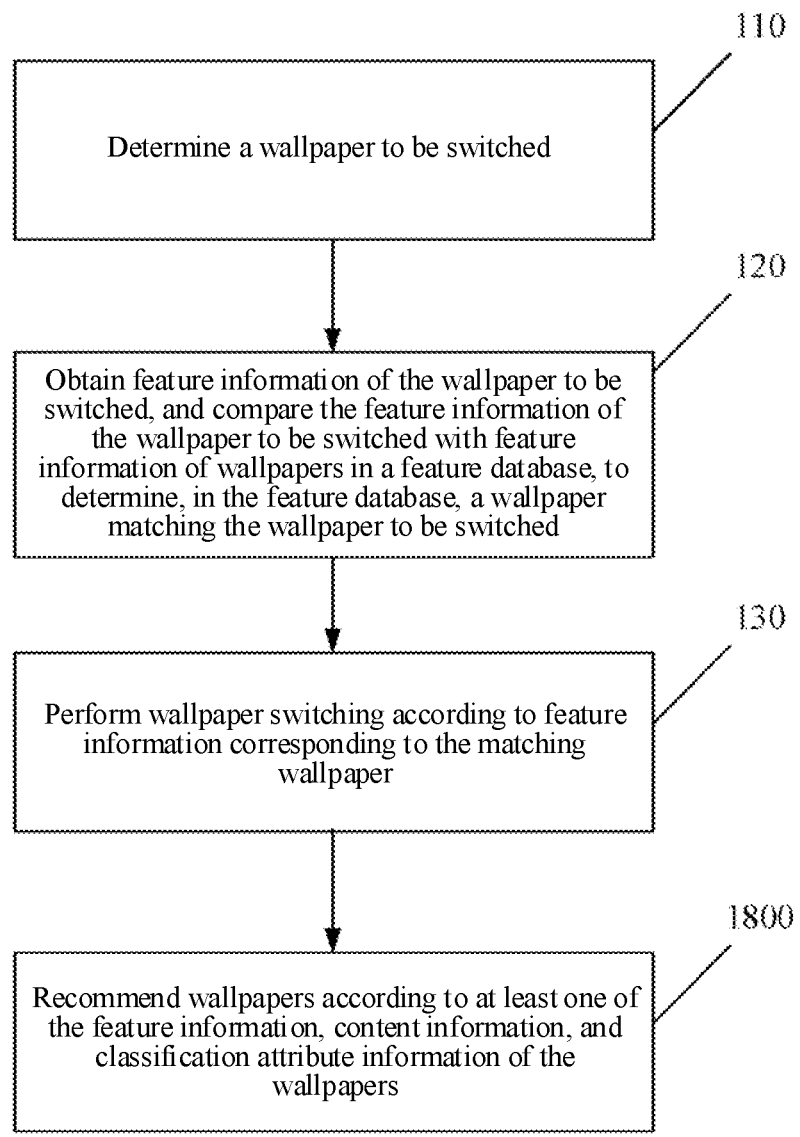
FIG. 18 is a flowchart of yet another wallpaper management method according to an embodiment of the present disclosure.

As shown in FIG. 18, the method may further include the following step.

Step 1800: Recommend wallpapers according to at least one of feature information, content information, and classification attribute information of the wallpapers.

The feature information of the wallpaper is derived from the foregoing step of obtaining feature information. A dominant color of the wallpaper may be used herein. The dominant color may be divided into several categories, and category labels are set respectively.

The classification attribute information is derived from preset classification of the wallpaper resource, and may be obtained from initialized data. The content information may be preset, or may be derived from a local artificial intelligence (AI) learning model, and may be implemented by using an existing AI picture classification model. Details are not described herein again.

Figure 19:
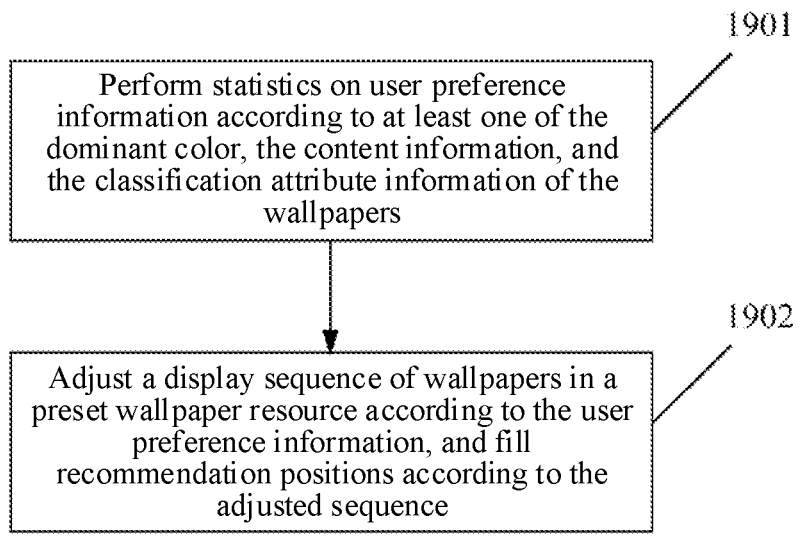
FIG. 19 is a flowchart of recommending wallpapers according to an embodiment of the present disclosure.

As shown in FIG. 19, in an embodiment, step 1800 includes the following steps.

Step 1901: Perform statistics on user preference information according to at least one of the dominant color, the content information, and the classification attribute information of the wallpapers.

A probability of each class in the classification attribute information, the content information, and the dominant color of the wallpapers used by the user is calculated, and three class labels with highest probabilities are obtained and cached.

Step 1902: Adjust a display sequence of wallpapers in a preset wallpaper resource according to the user preference information, and fill recommendation positions.

Recommended priorities may be set as follows: the classification attribute information has a highest priority, the content information has a second highest priority, and the dominant color has a lowest priority.

Figure 20:
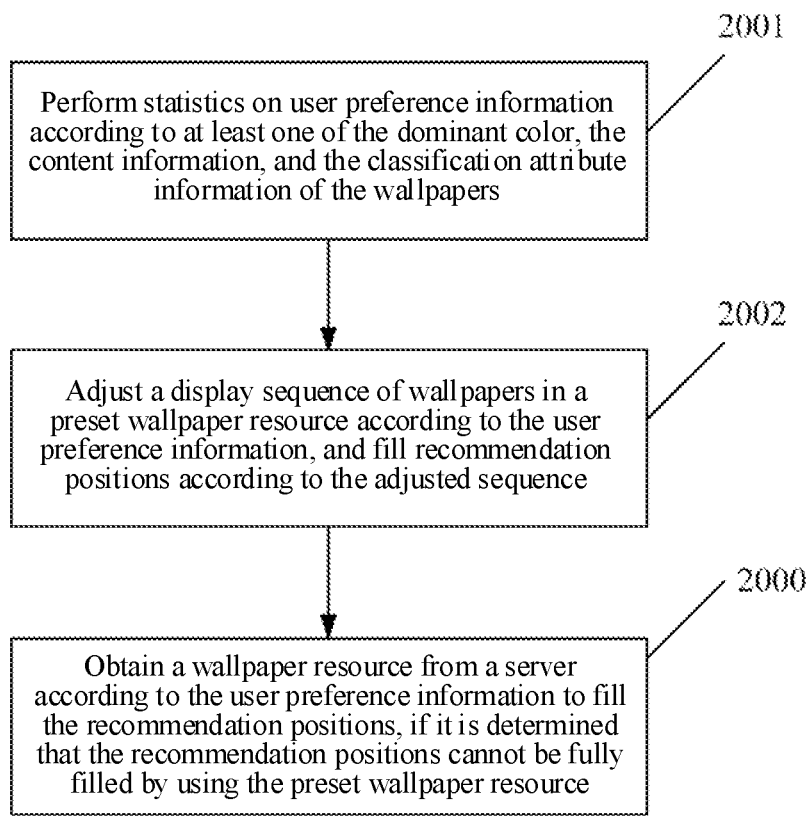
FIG. 20 is another flowchart of recommending wallpapers according to an embodiment of the present disclosure.

As shown in FIG. 20, in an embodiment, the method further includes the following step.

Step 2000: Obtain a wallpaper resource from a server according to the user preference information to fill the recommendation positions if it is determined that the recommendation positions cannot be fully filled by using the preset wallpaper resource.

In the embodiments of the present disclosure, interaction with the server is performed according to the feature information of the wallpapers, and the wallpaper resource most suitable for a use habit of the user is recommended to the user, so that the user is more satisfied with the beautifying resource.

Figure 21:
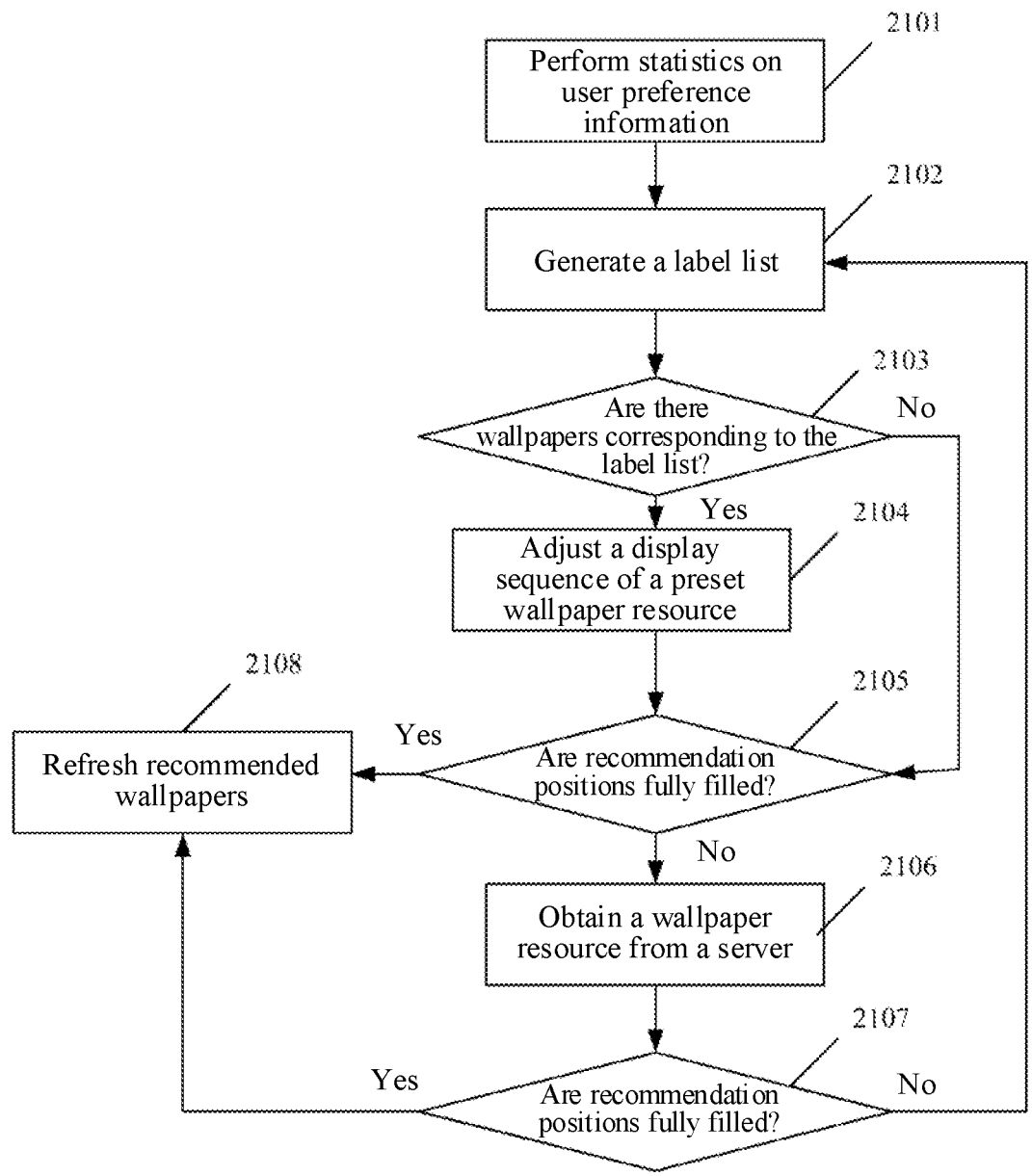
FIG. 21 is a flowchart of recommending wallpapers according to an application example of the present disclosure.

As shown in FIG. 21, a recommendation process of an application example of the present disclosure includes the following steps.

Step 2101: Perform statistics on user preference information according to feature auxiliary keys, the content information, and the classification attribute information of the wallpapers.

Data of the three data types are processed separately, to obtain three preference labels with highest probabilities, and record percentages thereof.

The feature auxiliary keys may be derived from the classification of the palette. For this part, reference may be made to the description about obtaining the auxiliary keys. Each wallpaper records information of three colors. The first three mean values are obtained by traversing all data to estimate a preferred type.

The classification attribute information of the wallpaper has a label of wallpaper classification and is preset (the downloaded resource is derived from a downloaded type). The first three types by statistics are used for calculation and percentages thereof are recorded.

The content information of the wallpaper has a label of wallpaper content. The first three types by statistics are used for calculation and percentages thereof are recorded.

Step 2102: Generate a label list.

Step 2103: Determine whether a preset wallpaper resource includes wallpapers corresponding to the label list, and if yes, perform step 2104.

For the three types of data, the wallpaper classification label has the highest priority, and this type of data is the most effective. Therefore, in a recommendation process, this type of data with the highest priority is used as the wallpaper content sequentially. When there are remaining recommendation positions in the type of content recommended by the server, auxiliary keys (the dominant color) are used for filtering.

Step 2104: Adjust a display sequence of the preset wallpaper resource according to recommendation labels.

Step 2105: Determine whether the recommendation positions are fully filled, and if yes, perform step 2108; otherwise, perform step 2106.

Step 2106: Obtain a wallpaper resource from the server according to the user preference information.

Step 2107: Determine whether the recommendation positions are fully filled, and if yes, perform step 2108; otherwise, perform step 2102.

Step 2108: Refresh recommended wallpapers.

In this application example, interaction with the server is performed according to the statistics on the feature information of the preset resource and the information about the wallpaper applied by the user, to recommend a wallpaper resource meeting the user preference to the user.

Figure 22:
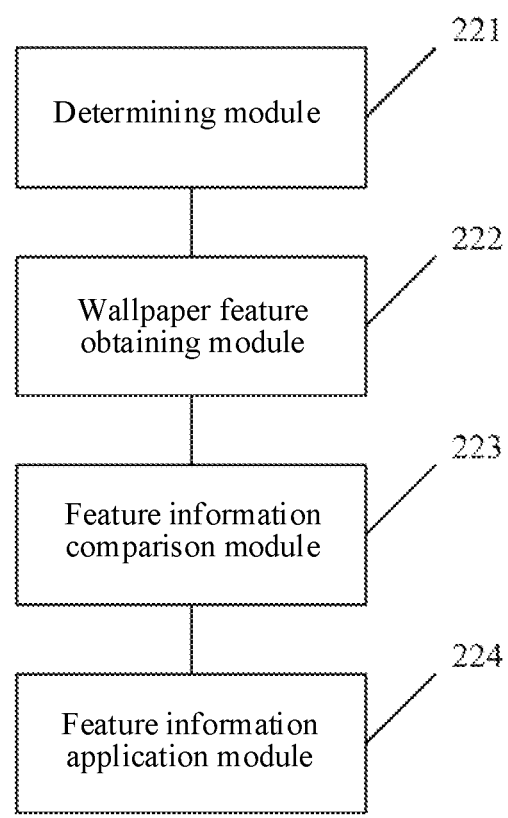
FIG. 22 is a schematic diagram of a wallpaper management apparatus according to an embodiment of the present disclosure.

As shown in FIG. 22, an embodiment of the present disclosure further provides a wallpaper management apparatus, and the apparatus may include:

a determining module 221, configured to determine a wallpaper to be switched;

a wallpaper feature obtaining module 222, configured to obtain feature information of the wallpaper to be switched;

a feature information comparison module 223, configured to compare the feature information of the wallpaper to be switched with feature information of wallpapers in a feature database, to determine, in the feature database, a wallpaper matching the wallpaper to be switched; and a feature information application module 224, configured to switch a wallpaper according to feature information corresponding to a matching wallpaper.

In the embodiments of the present disclosure, feature information matching is performed, to avoid inconsistency between a status of a wallpaper recorded in an application and a status of a wallpaper set in a system, which results from transmissions inside the application and abnormality caused by setting an external wallpaper interface.

Figure 23:
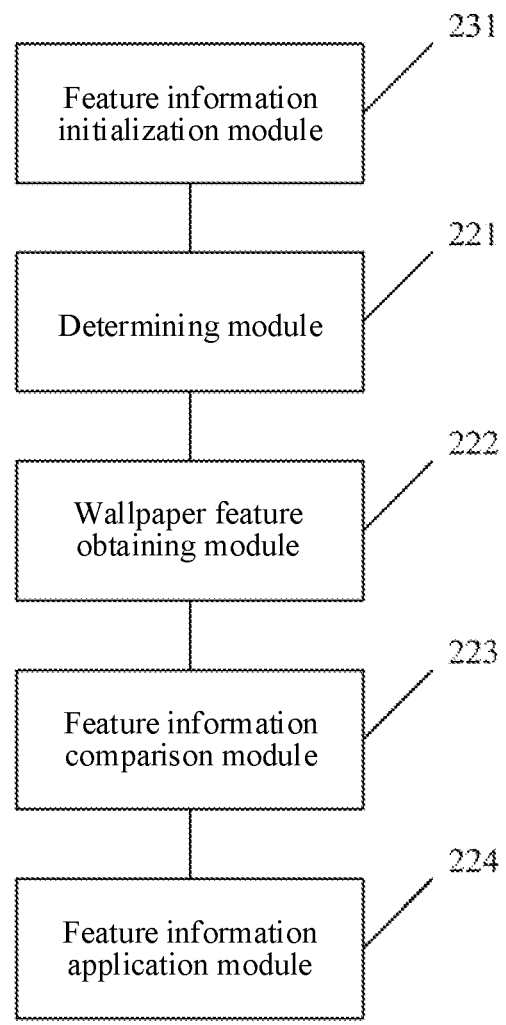
FIG. 23 is a schematic diagram of another wallpaper management apparatus according to an embodiment of the present disclosure.

As shown in FIG. 23, in an embodiment, the apparatus of the embodiment of the present disclosure may further include:

a feature information initialization module 231, configured to obtain feature information of wallpapers in wallpaper resources, and store the feature information into the feature database.

The feature database may be a locally stored database, or may be a cloud stored database.

Figure 24:
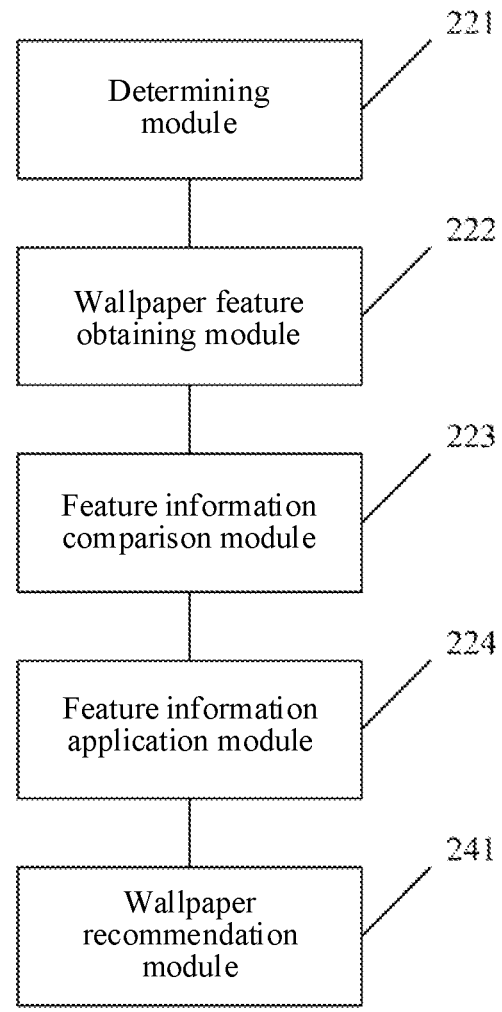
FIG. 24 is a schematic diagram of still another wallpaper management apparatus according to an embodiment of the present disclosure.

As shown in FIG. 24, in an embodiment, the apparatus of the embodiment of the present disclosure may further include:

a wallpaper recommendation module 241, configured to recommend wallpapers according to at least one of feature information, content information, and classification attribute information of the wallpapers.

Based on the above, in the embodiments of the present disclosure, extraction of a feature of a wallpaper is completed when a system wallpaper changes, and a process of setting and synchronizing an association status of a wallpaper is completed during comparing and confirming the feature. In this way, there is no need to distinguish sources of wallpaper settings, so that a status presented by a desktop application is consistent with an expected status when there are a plurality of wallpaper setting sources. In addition, in the embodiments of the present disclosure, interaction with the server may be completed through extraction and labeling of the wallpaper feature, to recommend a wallpaper resource meeting a wallpaper setting habit of the user to the user. According to the embodiments of the present disclosure, design styles of terminal products are consistent, thereby greatly improving user experience.

Figure 25:
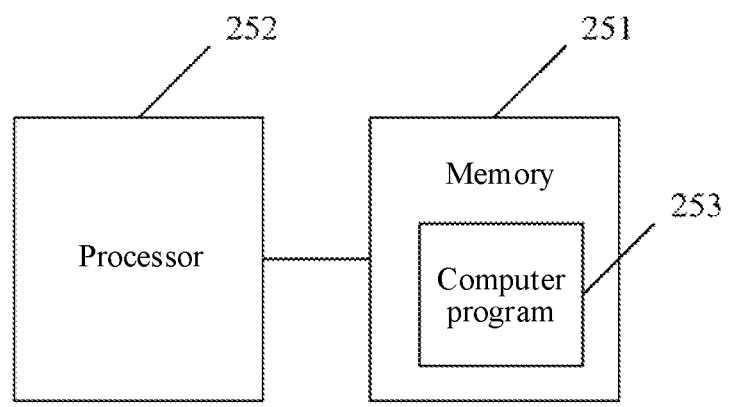
FIG. 25 is a schematic structural diagram of a mobile terminal according to an embodiment of the present disclosure.

As shown in FIG. 25, an embodiment of the present disclosure further provides a mobile terminal, including: a memory 251, a processor 252, and a computer program 253 that is stored in the memory 251 and runs on the processor, where the processor 252, when executing the computer program, implements the wallpaper management method.

An embodiment of the present disclosure further provides a computer-readable storage medium, storing computer-executable instructions, the computer executable instructions being used for performing the wallpaper management method.

In this embodiment, the storage medium may include: a plurality of media that can store program code, such as a universal serial bus (USB) flash disk, a read-only memory (ROM), a random access memory (RAM), a removable hard disk, a magnetic disk, or an optical disc.

A person of ordinary skill in the art may understand that, all or some of steps in the method, the system, and functional modules/units in the apparatus disclosed above may be implemented as software, firmware, hardware, or a proper combination thereof. In hardware implementation, division of the functional modules/units mentioned in the foregoing description may not necessarily correspond to division of physical components. For example, one physical component may include a plurality of functions, or one function of step may be performed by a plurality of physical components together. Some or all of the components may be implemented as software executed by a processor, such as a digital signal processor or a microprocessor, or may be implemented as hardware, or may be implemented as an integrated circuit, such as an application specific integrated circuit. The software may be distributed on a computer-readable medium, and the computer-readable medium may include a computer storage medium (or a non-transient medium) and a communication medium (or a transient medium). As known by a person of ordinary skill in the art, the term "computer-readable storage medium" includes volatile and non-volatile, removable and non-removable media implemented in a method for technology for storing information (such as computer-readable instructions, data structures, program modules, or other data). The computer storage medium includes a RAM, a ROM, an electrically erasable programmable ROM (EEPROM), a flash memory or another memory technology, a compact disc ROM (CD-ROM), a digital video disc-ROM (DVD) or another compact disc storage, a magnetic cassette, a magnetic tape, a magnetic cassette storage or another magnetic storage apparatus, or other media that may be configured to store expected information and accessed by a computer. In addition, it is known by a person of ordinary skill in the art that, the communication medium generally includes computer-readable instructions, data structures, program modules, or other data in a modulated data signal such as a carrier or another transmission mechanism, and may include a plurality of information transmission media.

What is claimed is:

1. A wallpaper management method, comprising:
   determining a wallpaper to be switched;
   obtaining feature information of the wallpaper to be switched, and comparing the feature information of the wallpaper to be switched with feature information of wallpapers in a feature database, to determine, in the feature database, a wallpaper matching the wallpaper to be switched; and
   performing wallpaper switching according to feature information corresponding to a matching wallpaper;
   wherein the feature information of each of the wallpaper to be switched and the wallpapers in the feature database comprises a respective feature primary key, and obtaining the feature information of the wallpaper to be switched comprises:
   scaling a size of the wallpaper to be switched to a target wallpaper size; and
   determining a feature primary key of the scaled wallpaper to be switched.

2. The method according to claim 1, wherein the determining a wallpaper to be switched comprises:
   listening to a system broadcast, to obtain an identifier of the wallpaper to be switched; and
   determining the wallpaper to be switched according to the identifier of the wallpaper to be switched if it is determined that an identifier of a current wallpaper is inconsistent with the identifier of the wallpaper to be switched.

3. The method according to claim 1, wherein the target wallpaper size comprises a target wallpaper width; and the scaling a size of the wallpaper to be switched to a target wallpaper size comprises:
determining a scaling ratio according to the target wallpaper width; and
scaling the wallpaper to be switched according to the scaling ratio.

4. The method according to claim 3, wherein before the determining a scaling ratio according to the target wallpaper width, the method further comprises:
determining the target wallpaper width according to a preset width value and a width of a mobile terminal.

5. The method according to claim 1, wherein the determining a feature primary key of the scaled wallpaper to be switched comprises:
dividing the scaled wallpaper to be switched into a plurality of blocks;
determining a grayscale feature value of each block;
determining a mean value of grayscale feature values of the plurality of blocks; and
comparing the mean value with the grayscale feature value of each block, to determine the feature primary key.

6. The method according to claim 1, wherein the feature information of each of the wallpaper to be switched and the wallpapers in the feature database further comprises a respective feature auxiliary key, and the feature auxiliary key of each wallpaper comprises a dominant color of the each wallpaper.

7. The method according to claim 6, wherein the obtaining feature information of the wallpaper to be switched comprises:
obtaining a palette object of the scaled wallpaper to be switched; and
calculating mean values of red, green, and blue colors in the palette object respectively, to obtain a dominant color of the scaled wallpaper to be switched.

8. The method according to claim 1, wherein the comparing the feature information of the wallpaper to be switched with feature information of wallpapers in a feature database, to determine, in the feature database, a wallpaper matching the wallpaper to be switched comprises at least one of the following:
comparing the feature information of the wallpaper to be switched with the feature information of the wallpapers in the feature database, and using a wallpaper meeting a first preset condition in the feature database as the wallpaper matching the wallpaper to be switched if it is determined that a comparison result meets the first preset condition; and
comparing the feature information of the wallpaper to be switched with the feature information of the wallpapers in the feature database, adding a wallpaper meeting a second preset condition in the feature database to an alternative list if it is determined that a comparison result meets the second preset condition, and selecting a wallpaper meeting a third preset condition in the alternative list as the wallpaper matching the wallpaper to be switched if it is determined no wallpaper in the feature database meets the first preset condition.

9. The method according to claim 8, wherein the feature information of each of the wallpaper to be switched and the wallpapers in the feature database further comprises a respective feature auxiliary key;
the first preset condition comprises: a distance difference between the feature primary key of the wallpaper to be switched and a feature primary key of the wallpaper in the feature database is less than a minimum primary key threshold, and a distance difference between the feature auxiliary key of the wallpaper to be switched and a feature auxiliary key of the wallpaper in the feature database is less than a maximum auxiliary key threshold;
the second preset condition comprises: a distance difference between the feature primary key of the wallpaper to be switched and the feature primary key of the wallpaper in the feature database is less than a maximum primary key threshold; and
the third preset condition comprises: in the alternative list, a distance difference from the feature primary key of the wallpaper to be switched is the smallest, and a distance difference from the feature auxiliary key of the wallpaper to be switched is less than a minimum auxiliary key threshold; or in the alternative list, a distance difference from the feature primary key of the wallpaper to be switched is the smallest, a distance difference from the feature auxiliary key of the wallpaper to be switched is less than a maximum auxiliary key threshold, and a distance difference from the feature primary key of the wallpaper to be switched is less than an intermediate primary key threshold.

10. The method according to claim 1, wherein after the comparing the feature information of the wallpaper to be switched with feature information of wallpapers in a feature database, the method further comprises:
performing wallpaper switching according to the feature information of the wallpaper to be switched if it is determined that no wallpaper in the feature database matches the wallpaper to be switched.

11. The method according to claim 1, wherein the performing wallpaper switching according to feature information corresponding to the matching wallpaper comprises:
performing wallpaper switching according to at least one of a feature additional key and a customized feature key that are comprised in the feature information corresponding to the matching wallpaper, wherein a priority of the customized feature key is higher than a priority of the feature additional key.

12. The method according to claim 1, further comprising:
recommending wallpapers according to at least one of feature information, content information, and classification attribute information of the wallpapers.

13. The method according to claim 12, wherein the recommending wallpapers according to at least one of feature information, content information, and classification attribute information of the wallpapers comprises:
performing statistics on user preference information according to at least one of a feature auxiliary key, the content information, and the classification attribute information of the wallpapers; and
adjusting a display sequence of wallpapers in a preset wallpaper resource according to the user preference information, and filling recommendation positions according to the adjusted sequence.

14. The method according to claim 13, further comprising:
obtaining a wallpaper resource from a server according to the user preference information to fill the recommendation positions, if it is determined that the recommendation positions cannot be fully filled by using the preset wallpaper resource.

15. A mobile terminal, comprising a memory, a processor, and a computer program that is stored in the memory and runs on the processor, wherein the processor, when executing the computer program, implements a wallpaper management method, comprising:

determining a wallpaper to be switched;

obtaining feature information of the wallpaper to be switched, and comparing the feature information of the wallpaper to be switched with feature information of wallpapers in a feature database, to determine, in the feature database, a wallpaper matching the wallpaper to be switched; and performing wallpaper switching according to feature information corresponding to a matching wallpaper;

wherein the feature information of each of the wallpaper to be switched and the wallpapers in the feature database comprises a respective feature primary key, and obtaining the feature information of the wallpaper to be switched comprises:

scaling a size of the wallpaper to be switched to a target wallpaper size; and determining a feature primary key of the scaled wallpaper to be switched.

16. A non-transitory computer-readable storage medium, storing computer executable instructions, the computer executable instructions being used for performing a wallpaper management method, comprising:

determining a wallpaper to be switched;

obtaining feature information of the wallpaper to be switched, and comparing the feature information of the wallpaper to be switched with feature information of wallpapers in a feature database, to determine, in the feature database, a wallpaper matching the wallpaper to be switched; and performing wallpaper switching according to feature information corresponding to a matching wallpaper;

wherein the feature information of each of the wallpaper to be switched and the wallpapers in the feature database comprises a respective feature primary key, and obtaining the feature information of the wallpaper to be switched comprises:

scaling a size of the wallpaper to be switched to a target wallpaper size; and determining a feature primary key of the scaled wallpaper to be switched.

* * * * *